Patented Aug. 12, 1952

2,606,921

UNITED STATES PATENT OFFICE 2,606,921

GLUTAMIC ACID SYNTHESIS

David I. Weisblat and Douglas A. Lyttle, Kalamazoo, Mich., assignors to The Upjohn Company, Kalamazoo, Mich., a corporation of Michigan No Drawing. Application September 7, 1950, Serial No. 183,676

8 Claims. (Cl. 260—485)

This invention relates to a method for the synthesis of glutamic acid.

Many procedures for the preparation of glutamic acid, the only amino acid which has found extensive use in commerce, have been proposed in the past. Probably the most suitable commercial preparation of this compound has been the hydrolysis of wheat gluten. This process, however, results in a pure levo-isomer, whereas, in many instances, the dextro-isomer, or a racemic mixture is desired. Investigators have therefore resorted to synthesis of the isomers and mixtures from various starting materials through tedious procedures not applicable to large scale commercial production.

It is, therefore, an object of the present invention to provide a commercially applicable method for the synthesis of glutamic acid utilizing readily available materials in a single procedure. It is an additional object of this invention to provide a method by which both the dextro- and levo-isomers of glutamic acid can be obtained. A further object of this invention is the provision of esters of alpha-nitro-glutaric acid which can be converted to esters of glutamic acid. Other objects of the invention will become apparent hereinafter.

The foregoing and additional objects of this invention have been accomplished by the provision of a process which essentially involves the addition reaction of a nitroacetate with an acrylate to form a di-ester of alpha-nitroglutaric acid, reducing the ester thus obtained to a diester of glutamic acid, and hydrolyzing the diester to glutamic acid or an ester thereof, as shown by the following diagram:

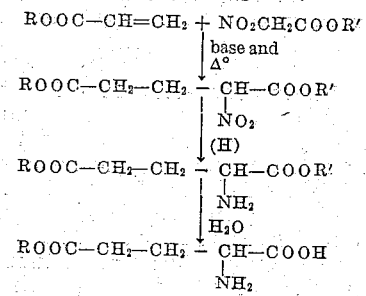

wherein R and R' are the same or different hydrocarbon radicals.

The addition reaction of the method of this invention can be accomplished by contacting an ester of nitroacetic acid with an ester of acrylic acid in the presence of a basic catalyst and heat. It has been found that when the process is conducted in this manner it is advantageously carried out in an inert solvent, such as dioxane, tetrahydrofurane, benzene, or the like, with dioxane being a preferred solvent.

Temperatures up to the reflux temperature of the reaction mixture are used satisfactorily, and there is a temperature-time relationship governing the length of reaction period, i. e., the higher the temperature the shorter the reaction time required, from fifty to seventy degrees centigrade for about 24 hours having been found preferable, when the solvent is dioxane. An alkaline catalyst, such as an alkali metal hydroxide, an alkali metal alkoxide, or a quaternary ammonium hydroxide, is required to promote the reaction, with a quaternary ammonium hydroxide, such as benzyltrimethyl ammonium hydroxide, being the preferred catalyst. The quantity of alkaline catalyst used is of importance in obtaining the intermediate nitroglutaric acid of this invention. When about four percent by weight of catalyst, based on the weight of the nitroacetate used, is added, little or no alpha-nitroglutaric acid is obtained. However, when about one percent of the catalyst is used, a satisfactory quantity of the alpha-nitroglutaric acid ester is obtained. Thus, amounts of alkaline catalyst between about 0.1 and about three percent form a critical portion of this invention. After the addition reaction is complete, a water-insoluble solvent, such as chloroform, ethylene dichloride, benzene, or the like, is added to the reaction mixture. The basic catalyst is removed by extraction with dilute aqueous acid, the organic layer washed with water, and the solvents and unreacted starting materials removed by distillation. The alpha-nitroglutaric acid esters thus obtained can be purified by fractional distillation under reduced pressure, and are colorless, high-boiling liquids.

While the above step has been described with particular reference to ethyl nitroacetate and ethyl acrylate, other esters, such as methyl, ethyl, propyl, isopropyl, butyl, hexyl, and benzyl esters of both acids may be used.

The reduction of the nitroglutaric acid ester can be carried out in any suitable manner, which will convert the nitro group to an amino group. For example, a solution of the ester of nitroglutaric acid in a solvent, such as ethanol, or butanol, can be reduced by hydrogen under pressure at elevated temperatures, i. e., above about fifty degrees centigrade and about 100 p. s. i. pressure, in the presence of a hydrogenation catalyst such as Raney nickel, platinum oxide, platinum or palladium. The apparatus and the exact method of conducting the catalytic hydrogenation is of concern only in that the nitro group of the nitroester be reduced to an amino group by the procedure. When the reduction is carried out in the absence of added acid, particularly at temperatures above about fifty degrees centigrade or higher, the glutamic acid ester which is formed is at least partially converted to a cyclic lactam, an ester of 5-carboxypyrrolidone-2. Since the next step of the method of the present invention is hydrolysis to the free acid, it is not material which of the compounds is formed, as they are both converted by aqueous acid to the free acid. The product can be converted to glutamic acid or esters thereof by various hydrolytic procedures described in the literature such as that of Angier et al., J. Am. Chem. Soc. 72, 74 (1950), which involve the aqueous hydrolysis of the aminoester, lactam or mixtures thereof. The hydrolytic mixture is usually heated with the acid or base for a time sufficient to convert all of the material to the free acid.

The reduction can also be accomplished by the employment of iron, iron filings, tin, zinc, and a concentrated aqueous acid, e. g., hydrochloric acid. When this method is used, a salt of the amino acid is obtained, the ester groups being hydrolyzed during the reduction by the aqueous acid which is present. Ammonium sulfide as well as other chemical reducing agents can also be used to reduce the nitro group to an amino group if desired. Glutamic acid, esters of glutamic acid, or salts thereof can be isolated from the reaction mixtures in a conventional manner, among which are those already known for the isolation of glutamic acid and are not a part of the process of this invention.

PREPARATION OF ESTERS OF NITROACETIC ACID

The following procedure was employed for the preparation of the methyl, isopropyl, n-hexyl, cyclohexyl, and benzyl esters of nitroacetic acid:

One mole of alcohol was introduced slowly into 0.38 mole of concentrated sulfuric acid with cooling. Nitroacetic acid (0.25 mole) was then added at a temperature between about zero and five degrees centigrade and the mixture stirred until solution was obtained. The solution was then allowed to stand at room temperature for from twenty to forty hours, at the end of which time it was diluted with ice and ice-water. Water was separated and the organic layer diluted with two volumes of ether, after which the ether solution was washed three times with water and dried over magnesium sulfate. After filtration and concentration, the remaining oil was treated in either of the following two ways, depending upon the structure and water solubility of the alcohol used in the esterification.

The methyl and isopropyl esters of nitroacetic acid were subjected to one distillation which yielded the essentially pure ester.

The n-hexyl, cyclohexyl, and benzyl esters were found to form sodium salts which were relatively insoluble in water, insoluble in acetone and ether, and very soluble in alcohol. This was advantageous, inasmuch as the corresponding alcohols appear to have a low water-solubility and are not easily removed from the ester product. The sodium salts were isolated and purified in the following manner:

After the removal of as much alcohol as possible by distillation, the crude ester was treated slowly, with stirring and cooling in an ice bath, with between about 100 and 150 milliliters of ten percent aqueous sodium hydroxide solution. The sodium salt which precipitated was filtered and washed twice with about fifteen milliliters of ice-water and then with acetone. The salt was dried, weighed, and treated with two equivalents of hydrochloric acid in about 100 milliliters of water. The reaction was generally found to be slow, and prolonged shaking was usually necessary to completely free the ester. Ether extraction, followed by washing, drying, and concentration of the ether, resulted in the production of a relatively pure ester, as will be apparent from the analysis of benzyl nitroacetate obtained by the above method.

|  | C | H | N |
|---|---|---|---|
| Theory | 55.3 | 4.64 | 7.75 |
| Found | 55.82 | 4.43 | 7.78 |
|  | 55.96 | 4.34 | 7.69 |

In the preparation of the benzyl ester, it was found advantageous to use dry hydrochloric acid gas as a condensing agent, and the procedure employed was as follows:

Benzyl alcohol (127 grams) and 26.3 grams of nitroacetic acid were mixed, and dry hydrochloric acid gas passed into the mixture with cooling until the solution was saturated at zero degrees centigrade. The solution was allowed to warm to room temperature and was thereafter allowed to stand for two days. Most of the hydrochloric acid gas, some benzyl chloride, and some alcohol was removed by concentration in vacuo. After dilution with ether, washing with water, drying the ether solution, and concentrating, the ester was treated with sodium hydroxide and worked up as described above.

Properties of some representative esters of nitroacetic acid are as follows:

| Esters | B. P., °C. | mm. Hg. | $n_D^{23°C}$ |
|---|---|---|---|
| Methyl | 68.5 | 5.0 | 1.42257. |
| Ethyl | 76 | 5.0 | 1.4210. |
| Isopropyl | 52 | 0.9 | 1.4203. |
| n-Hexyl |  |  | 1.4364 at 20° C. |
| Cyclohexyl |  |  | 1.4640 at 23° C. |
| Benzyl |  |  | 1.5202 at 22° C. |

Example 1.—Diethyl alpha-nitroglutarate

To a stirred solution at room temperature of 13.3 grams of ethyl nitroacetate and three milliliters of forty percent aqueous trimethylbenzyl ammonium hydroxide in twenty milliliters of dioxane, fifteen grams of ethyl acrylate was added dropwise over fifteen minutes. After the addition had been completed, the reaction temperature was raised to between about sixty and 65 degrees centigrade where it was maintained for 24 hours. After cooling, an equal volume of ethylene dichloride was added to the reaction mixture which was then acidified by the addition of 1-normal hydrochloric acid. The ethylene dichloride layer was washed several times with 75-milliliter portions of water and the water washes discarded. The solvents and unreacted materials were removed under reduced pressure and the residual oil fractionally distilled. There was thus obtained 12.8 grams of diethyl alpha-nitroglutarate, distilling at 109–112 degrees centigrade at a pressure of 1.0 millimeter of mercury; $n_D^{20}=1.1670$.

Analysis—
    Calculated for $C_8H_{15}N_6$: N, 6.01
    Found: 6.22

In a manner similar to that of Example 1, isopropyl nitroacetate condenses with ethyl acrylate to yield ethyl isopropyl alpha-nitroglutarate; butyl nitroacetate condenses with benzyl acrylate to yield benzyl butyl alpha-nitroglutarate; hexyl nitroacetate condenses with methyl acrylate to yield methyl hexyl alpha-nitroglutarate; cyclohexyl nitroacetate condenses with hexyl acrylate to yield hexyl cyclohexyl alpha-nitroglutarate; benzyl nitroacetate condenses with pentyl acrylate to form pentyl benzyl alpha-nitroglutarate, et cetera.

*Example 2.—Reduction of alpha-nitroglutaric acid esters*

Diethyl alpha-nitroglutarate (2.66 grams), fifteen milliliters of absolute ethanol, and about one-half gram of Raney nickel catalyst are placed in a bomb of forty milliliters capacity. The reduction is carried out at about 100 degrees centigrade under an original hydrogen pressure of 1500 p. s. i. at 25 degrees centigrade. After the theoretical quantity of hydrogen is absorbed, the bomb is cooled, the contents removed and the catalyst separated from the solution. Upon removing the alcohol the residue of crude product can be purified further if desired, or it can be hydrolyzed directly to glutamic acid by an aqueous acid solution.

*Example 3.—Preparation of glutamic acid*

The reduction product, obtained from Example 2, is heated under reflux and treated with at least a two molar excess of aqueous hydrochloric acid. The pH of the solution is thereafter adjusted to about 3.2 by the addition of an aqueous solution of disodium hydrogen phosphate and the glutamic acid which precipitates separated from the supernatant liquid by filtration. There is thus obtained a racemic mixture of glutamic acid, melting, with decomposition, at about 199 degrees centigrade.

In a like manner other esters of alpha-nitroglutaric acid can be reduced and hydrolyzed to yield the corresponding diester of glutamic acid.

Various modifications may be made in carrying out the method of the invention without departing from the spirit or scope thereof, and it is to be understood that we limit ourselves only as defined by the appended claims.

This application is a continuation-in-part of our copending application Serial 713,094, filed November 29, 1946, now Patent No. 2,570,297.

We claim:

1. In a method for the preparation of glutamic acid, the steps which include: alkylating an ester of nitroacetic acid with an ester of acrylic acid in the presence of an effective amount up to about three percent of a basic catalyst reducing the substituted nitroacetate thus produced to an amino ester, and hydrolyzing the amino ester to a racemic mixture of glutamic acid.

2. In a method for the preparation of glutamic acid, the steps which include: reacting an ester of nitroacetic acid with an ester of acrylic acid in the presence of an effective amount of up to about three percent of a basic catalyst, whereby an ester of alpha-nitroglutaric acid is formed; reducing the nitroglutarate thus produced by means of hydrogen and a hydrogenation catalyst to a diester of glutamic acid; and, hydrolyzing the diester to glutamic acid.

3. In a method for the preparation of glutamic acid, the step of reacting an ester of nitroacetic acid with an ester of acrylic acid in the presence of an effective amount of up to about three percent of a basic catalyst.

4. The method according to claim 3, wherein the basic catalyst is benzyltrimethyl ammonium hydroxide.

5. The method according to claim 3, wherein the reaction is conducted at a temperature between about fifty and about seventy degrees centigrade and wherein dioxane is used as the reaction medium.

6. A diester of alpha-nitroglutaric acid.

7. Diethyl alpha-nitroglutarate.

8. In a method for the preparation of glutamic acid, the steps which include: condensing ethyl nitroacetate with ethyl acrylate in the presence of an effective amount up to about three percent of benzyltrimethylammonium hydroxide; reducing the diethyl alpha-nitroglutarate thus produced with hydrogen in the presence of Raney nickel to diethyl glutamate, and, hydrolyzing the reduction product to a racemic mixture of glutamic acid with an aqueous acid.

DAVID I. WEISBLAT.
DOUGLAS A. LYTTLE.

REFERENCES CITED

The following references are of record in the file of this patent:

UNITED STATES PATENTS

| Number | Name | Date |
|---|---|---|
| 2,342,119 | Bruson | Feb. 22, 1944 |

OTHER REFERENCES

Ser. No. 374,864, Wiest et al. (A. P. C.), published June 15, 1943.